United States Patent [19]
Ozawa et al.

[11] Patent Number: 5,872,445
[45] Date of Patent: Feb. 16, 1999

[54] POWER SUPPLY DEVICE HAVING LOW INTERNAL POWER CONSUMPTION AND ELECTRONIC APPLIANCES USING SAID POWER SUPPLY DEVICE

[75] Inventors: Hidekiyo Ozawa; Masafumi Okumura; Hidetoshi Yano; Mituo Saeki, all of Kawasaki, Japan

[73] Assignee: Fujitsu Limited, Kawasaki, Japan

[21] Appl. No.: 511,350

[22] Filed: Aug. 4, 1995

[30] Foreign Application Priority Data

Sep. 9, 1994 [JP] Japan ................................. 6-215436

[51] Int. Cl.$^6$ ................................. H02J 7/00; H02J 7/04
[52] U.S. Cl. ................. 320/137; 320/107; 320/DIG. 12; 320/163
[58] Field of Search .............................. 320/5, 15, 2, 61, 320/27–29, 162, 163, 107, 138, 140, 116, DIG. 12, 137; 363/142; 307/43, 80, 61

[56] References Cited

U.S. PATENT DOCUMENTS

| | | | |
|---|---|---|---|
| 5,150,031 | 9/1992 | James et al. ................................. | 320/2 |
| 5,150,032 | 9/1992 | Ho ............................................. | 320/14 |
| 5,185,565 | 2/1993 | Uchida ................................. | 320/27 X |
| 5,317,249 | 5/1994 | Ford ........................................... | 320/2 |
| 5,493,197 | 2/1996 | Eguchi et al. ............................. | 320/5 |
| 5,504,411 | 4/1996 | McCaleb et al. .......................... | 320/2 |

FOREIGN PATENT DOCUMENTS

| | | |
|---|---|---|
| 0588727 A1 | 3/1994 | European Pat. Off. ........... H02J 7/00 |
| 61-207145 | 9/1986 | Japan . |
| 62-260521 | 11/1987 | Japan . |
| 4-125034 | 4/1992 | Japan . |

*Primary Examiner*—Peter S. Wong
*Assistant Examiner*—K. Shin
*Attorney, Agent, or Firm*—Nikaido, Marmelstein, Murray & Oram LLP

[57] ABSTRACT

A power supply device includes a secondary battery and a charger, and can further utilize an external D.C. power supply. A switch is interposed between a negative electrode of the secondary battery and the ground. This switch is turned OFF when the external D.C. power supply is connected to the power supply device, and is turned ON when the external D.C. power supply is removed from the power supply device. The charger controls the charge of the secondary battery from the external D.C. power supply by regulating the potential of the negative electrode of the battery. A contact remains OFF while the external D.C. power supply is connected to the power supply device. In consequence, a current does not directly flow from the external D.C. power supply to the secondary battery. Therefore, a back-flow prevention diode, which otherwise results in power consumption, need not be disposed between the secondary battery and the load.

65 Claims, 7 Drawing Sheets

Fig. 3(b) VOLTAGE AT A POINT

POWER SUPPLY DEVICE HAVING LOW INTERNAL POWER CONSUMPTION AND ELECTRONIC APPLIANCES USING SAID POWER SUPPLY DEVICE

BACKGROUND OF THE INVENTION

1. Field of the Invention

This invention relates to a power supply device for efficiently supplying power to a load by reducing the internal power consumption of the device, and to an electronic appliance equipped with such a power supply device.

2. Description of the Related Art

An electronic appliance such as a notebook type personal computer contains a secondary battery such as a NiCd battery as a power supply device. The appliance can also utilize a D.C. voltage, obtained by rectifying a commercial A.C. power supply, as an external D.C. power supply. A charger is provided to the appliance so as to charge the secondary battery from the external D.C. power supply. When the external D.C. power supply is utilized, an A.C. adaptor for rectifying the commercial A.C. power supply and obtaining the D.C. voltage is connected to the power supply device. The secondary battery and the external D.C. power supply are connected in parallel across the load. Back-flow prevention diodes are interposed between the secondary battery and the load and between the external D.C. power supply and the load lest a current flows from the secondary battery to the external D.C. power supply or from the external D.C. power supply to the secondary battery. When the external D.C. power supply is inputted, the voltage of the external D.C. power supply is set to a level higher than that of the voltage of the secondary battery. Therefore, the supply of power to the load is made from the external D.C. power supply. When the external D.C. power supply is inputted and the voltage of the secondary battery drops below a predetermined value, the charger charges the secondary battery. When the A.C. adaptor is removed and the input of the external D.C. power supply is cut off, the supply of power to the load is made from the secondary battery.

In the power supply device according to the prior art described above, the back-flow prevention diode is interposed between the load and the secondary battery. Therefore, a load current flows through this back-flow prevention diode when power is supplied from the battery to the load, and a power loss develops in the back-flow prevention diode. This power loss in the back-flow prevention diode cannot be neglected in consideration of the battery capacity. The voltage drop of the diode is as great as from 0.55 to about 0.7 V. When six NiCd batteries are used as the secondary battery, the power loss reaches 7.6 to 10% of the battery capacity. When the battery consists of two NiCd batteries, the proportion of the power loss becomes further higher, and reaches 23 to 30% of the battery capacity.

SUMMARY OF THE INVENTION

It is therefore an object of the present invention to provide a power supply device having a low power loss and an electronic appliance using the power supply device.

To accomplish this object, the power supply device according to the present invention includes a secondary battery and a charger, and can further utilize an external D.C. power supply. A switch is disposed between the negative electrode of the secondary battery and the ground. This switch is turned OFF when the external D.C. power supply is connected to the power supply device and is turned ON when the latter is removed from the power supply device. The charger controls charge from the external D.C. power supply to the secondary battery by regulating the potential of the negative electrode of the battery.

When an A.C. adaptor is connected to the power supply device and power is supplied from the external D.C. power supply to the load, this switch is turned OFF and the negative electrode of the secondary battery is cut off from the ground. Therefore, a charge current does not directly flow from the external D.C. power supply to the battery. When the A.C. adaptor is removed from the power supply device, the switch is turned ON and the negative electrode of the secondary battery is connected to the ground. Consequently, power is supplied from the secondary battery to the load. Since the secondary battery is directly connected to the load without passing through a back-flow prevention diode at this time, the power loss due to this back-flow prevention diode does not occur, and the efficiency of the power supply device can be improved.

A MOSFET is often used for the switching device for the charger. In the present invention, the switching device of the charger can be disposed on the negative electrode side of the secondary battery. Therefore, a voltage having a positive polarity can be used as a control voltage of the gate of the MOSFET. This means that an n-type MOSFET can be used as the switching device. Because an n-type MOSFET has a lower ON resistance than a p-type MOSFET, power consumption in the switching device of the charger can be reduced.

Further, when a DC-DC convertor is disposed on the output side of the power supply device, an n-type MOSFET can be used as the switching device of the DC-DC convertor. Therefore, power consumption in the DC-DC convertor can be reduced, as well.

BRIEF DESCRIPTION OF THE DRAWINGS

The above objects and features of the present invention will become more apparent from the following description of the preferred embodiments with reference to the accompanying drawings, wherein.

DESCRIPTION OF THE PREFERRED EMBODIMENTS

Figure 1:
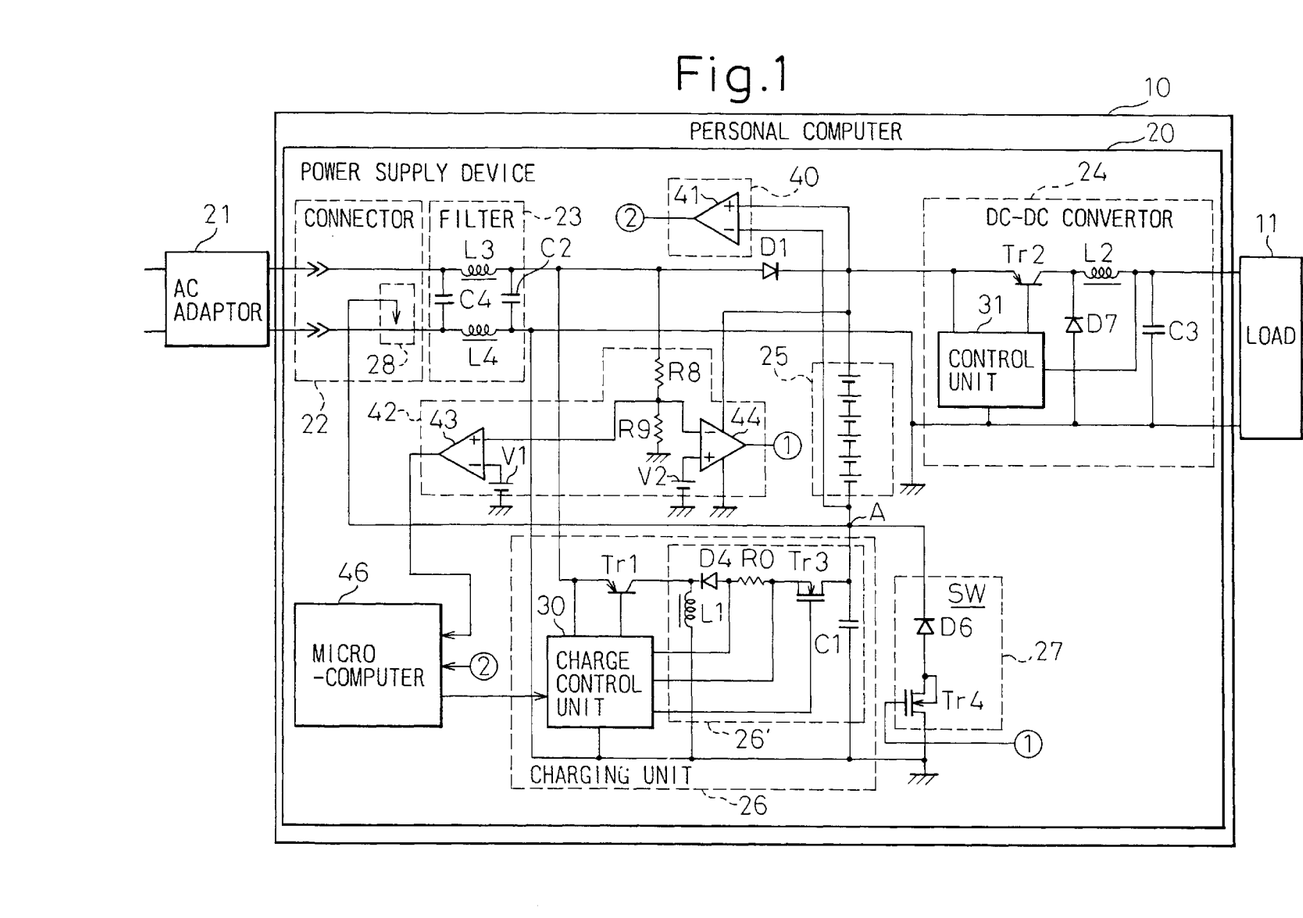
FIG. 1 is a circuit diagram of the first embodiment of the present invention.

FIG. 1 is a circuit diagram of the first embodiment of the present invention. In FIG. 1, reference numeral 10 denotes a portable personal computer, which contains a power supply device 20 and a load 11. Reference numeral 21 denotes an A.C. adaptor for rectifying a commercial A.C.

voltage to a D.C. voltage. When the A.C. adaptor 21 is fitted to a plug socket and connected to a connector 22 of the power supply device 20, power is supplied from the external D.C. power supply. The detail of this connector 22 will be described elsewhere. Reference numeral 23 denotes a filter for removing ripple from the external D.C. power supply. In the filter 23, symbols $C_2$ and $C_4$ denote capacitors, and $L_2$ and $L_4$ denote choke coils, respectively. Reference numeral 25 denotes a secondary battery. Symbol $D_1$ denotes a back-flow prevention diode for preventing a current from flowing from the secondary battery 25 to the filter 23 on the external D.C. power supply side. Reference numeral 24 denotes a DC-DC convertor. This convertor 24 converts the voltage of the external D.C. power supply or the secondary battery 25 to a constant voltage and outputs it to the load 11. In the DC-DC convertor 24, symbol Tr2 denotes a control transistor, L2 is a choke coil, C3 is a capacitor and D7 is a flyback diode. Reference numeral 31 denotes a control unit, which keeps the output voltage of the DC-DC convertor 24 at a constant voltage by executing ON/OFF control of the switching transistor Tr2 on the basis of the output voltage of the DC-DC convertor 24. Since the content of this control unit 31 is well known in the art, its detailed explanation will be omitted. For instance, a commercially available IC can he used for this purpose. Reference numeral 26 denotes a charging unit, which charges the secondary battery 25 from the external D.C. power supply by controlling the voltage at the negative electrode of the secondary battery 25. In the description which follows, the point of the negative electrode of the secondary battery 25 will be referred to as the "A" point.

In the charging unit 26, symbol Tr1 denotes a control transistor, and reference numeral 30 denotes a charge control unit. Since the content of this charge control unit is well known in the art. For instance, a commercially available IC can be used. Reference numeral 26' denotes a negative voltage generation unit. In the negative voltage generation unit 26', symbol L1 denotes a choke coil and D4 denotes a flyback diode. Symbol R0 denotes a resistor for detecting a charge current. Symbol Tr3 denotes a switching transistor. This transistor Tr3 is turned ON when the secondary battery 25 is charged upon instruction from the charge control unit 30, and is turned OFF when the secondary battery 25 is not charged. Symbol C1 denotes a capacitor for smoothing the negative voltage generated by the negative voltage generation unit 26'.

Figure 2:
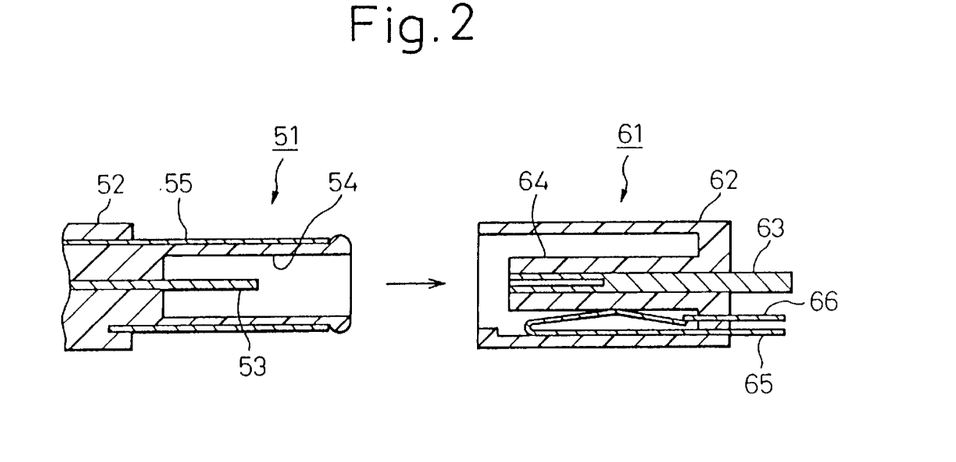
FIG. 2 shows in detail a connector.

Reference numeral 28 denotes a contact. This contact 28 is disposed inside the connector 22 and is connected between the negative electrode of the secondary battery 25 and the ground. FIG. 2 shows in detail the connector 22 and the contact 28.

In FIG. 2, reference numeral 51 denotes a plug, which is connected to the A.C. adaptor 21. Reference numeral 61 denotes a jack, which is disposed in the power supply device 20. FIG. 2 shows the state where the plug 51 and the jack 61 are separated from each other. The plug 51 comprises a center electrode 53 buried in an insulating body 52, an insulating collar 54 disposed around the center electrode 53 and a sleeve electrode 55 shaped into a cylindrical shape around the outer periphery of the insulating collar 54. The jack 61 comprises an insulating housing 62, a center electrode 63 disposed at a holding portion 64 formed at the center of the housing 62, a sleeve spring 65 disposed in the space around the holding portion 64, and an auxiliary spring 66. When the plug 51 and the jack 61 are cut off from each other, the sleeve spring 65 and the auxiliary spring 66 are in mutual contact. When the plug 51 is fitted into the jack 61, the center electrode 53 comes into contact with the center electrode 63, and the sleeve electrode 55 comes into contact with the sleeve spring 65. At the same time, the sleeve electrode 55 of the plug 51 moves outward the sleeve spring 65 of the jack 61, and the contact between the sleeve spring 65 and the auxiliary spring 66 is cut.

The center electrode 53 of the plug 51 is connected to the positive electrode of the A.C. adaptor 21 and the sleeve electrode 55 is connected to the negative electrode side. The center electrode 63 of the jack 61 is connected to the positive electrode side of the power supply device and the sleeve spring 65 is connected to the negative electrode of the power supply device. The auxiliary spring 66 is connected to the negative electrode of the secondary battery 25. The contact 28 shown in FIG. 1 comprises the sleeve spring 65 and the auxiliary spring 66.

The contact 28 need not necessarily be formed inside the connector 22, and can be constituted by a microswitch which operates and is turned OFF when the plug is fitted into the jack, for example.

Turning back to FIG. 1, reference numeral 27 denotes a switch circuit, which is connected between the negative electrode of the secondary battery 25 and the ground. In the switch circuit 27, symbol D6 denotes a switching diode. Symbol Tr4 denotes a switching transistor, which is turned ON when the voltage of the external D.C. power supply is detected inside the power supply device 20.

Reference numeral 40 denotes a battery voltage monitor unit 40. This unit 40 includes a differential amplifier 41. The differential amplifier 41 detects the voltage of the secondary battery 25 and inputs it to the microcomputer 46. Reference numeral 42 denotes an external input voltage detection unit. This detection unit 42 includes a comparator 43 and another comparator 44. Each comparator 43, 44 compares the voltage detected from a voltage divider resistor R8, R9 with a reference voltage V1, V2. When the A.C. adaptor 21 is connected and the voltage of the external D.C. power supply is detected, the comparator 43 outputs an H signal, and when the voltage is not detected, it outputs an L signal. The output signal of the comparator 43 is inputted to the microcomputer 46. The comparator 44 outputs the L signal when the voltage of the external D.C. power supply is detected, and outputs the H signal when the voltage is not detected. The output signal of the comparator 44 is inputted to the gate of the transistor Tr4 of the switch circuit 27.

The output signal of the differential amplifier 41 of the battery voltage monitor unit 40 and the output signal of the comparator 43 of the external input voltage detection unit 42 are inputted to the microcomputer 46. The voltage signal from the differential amplifier 41 is inputted to an A/D conversion input portion (not shown) of the microcomputer 46. The microcomputer 46 delivers a control signal, which starts the charging operation, to the charge control unit 30 when the A.C. adaptor 21 is connected, the voltage of the external D.C. power supply is detected, and moreover, the voltage of the secondary battery 25 drops.

Next, the operation of the circuit shown in FIG. 1 will be explained.

(1) When external D.C. power supply is used

When the A.C. adaptor 21 is fitted into the plug socket of the commercial power supply and is connected to the connector 22, the contact 28 is turned OFF. Power is supplied from the external D.C. power supply to the power supply device through the connector 22. Since the comparator 44 of the external input voltage detection unit 42 outputs the L signal to the gate of the switching transistor Tr4 of the switch circuit 27, the switching transistor Tr4 is turned OFF. Consequently, the negative electrode of the secondary battery 25 is cut off from the ground, and only the voltage of the external D.C. power supply is inputted to the DC-DC convertor 24. This convertor 24 converts the voltage of the external D.C. power supply to a constant voltage and supplies it to the load.

While the external input voltage detection unit 42 detects the voltage of the external D.C. power supply, the microcomputer 46 judges whether or not the voltage of the secondary battery 25 from the battery voltage monitor unit 40 is above the reference value. When the drop of the battery voltage is detected, the microcomputer 46 outputs the control signal instructing the operation to the charge control unit 30.

Figure 3A:
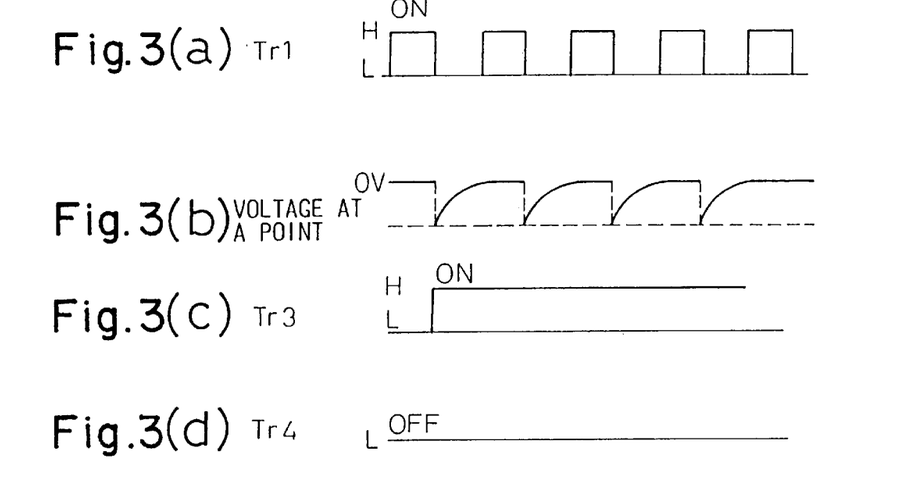
FIG. 3 is a time chart useful for explaining the operation of the circuit shown in FIG. 1.

The operation of the charge control unit 30 will be explained with reference to the time chart of FIG. 3. In FIG. 3, (a) indicates the operation of the control transistor Tr1, the H level indicates ON and the L level indicates OFF, (b) shows the voltage change at the A point (at the negative electrode of the secondary battery 25), (c) shows the operation of the switching transistor Tr3, and (d) shows the operation of the switching transistor Tr4.

When the control signal is inputted from the microcomputer 46, the charge control unit 30 starts the ON/OFF control of the control transistor Tr1 (see FIG. 3(a)), and at the same time, outputs the ON signal to the gate of the switching transistor Tr3. The switching transistor Tr3 is turned ON when the voltage at the A point becomes negative, and thereafter keeps the ON state (see FIG. 3(c)). Detecting the voltage of the external D.C. power supply, the comparator 44 of the external input voltage detection unit 42 outputs the L signal and turns OFF the switching transistor Tr4 of the switch circuit 27. Accordingly, the switching transistor Tr4 is kept OFF during the charging period as shown in FIG. 3(d).

When the control transistor Tr1 is ON, the current flows through the choke coil L1 and energy is accumulated. When the control transistor Tr1 is turned OFF, energy accumulated in the choke coil L1 passes the current through the circuit comprising the capacitor C1—switching transistor Tr3—resistor R0—diode D4—choke coil L1. As a result, the voltage at the A point becomes negative with respect to the ground (see FIG. 3(b)). This negative voltage controls the voltage of the negative electrode of the secondary battery 25, and the charging current flows through the secondary battery 25. Since the charging current flows also through the resistor R0 at this time, the voltage corresponding to the charging current develops across both ends of the resistor R0 and is inputted to the charge control unit 30. The charge control unit 30 regulates the ON period of the control transistor Tr1 in accordance with the quantity of the charging current so that the secondary battery 25 can be charged by a suitable charging current.

While the external D.C. power supply is supplied to the power supply device 20, the contact 28 which connects the negative electrode of the secondary battery 25 to the ground and the switching transistor Tr4 are both OFF. Therefore, the current does not directly flow from the external D.C. power supply to the secondary battery 25. Accordingly, the back-flow prevention diode need not be interposed between the load and the secondary battery 25 in the circuit shown in FIG. 1.

(2) When secondary battery 25 is used as power supply

When the A.C. adaptor 21 is removed from the connector 22, the contact 28 is turned ON, and the negative electrode of the secondary battery 25 is connected to the ground. Consequently, only the voltage of the secondary battery 25 is inputted to the DC-DC convertor 24. The DC-DC convertor 24 converts the output voltage of the secondary battery 25 to a predetermined constant voltage and outputs it to the load. At this time, since the back-flow prevention diode D1 exists, the current does not flow from the secondary battery 25 to the external input voltage detection unit 42, etc. on the external D.C. power supply side.

Because the secondary battery 25 is directly connected to the input side of the DC-DC convertor 24 without passing through the back-flow prevention diode, power consumption does not develop in a back-flow prevention diode interposed between the secondary battery and the DC-DC convertor as has been observed in the power supply devices according to the prior art. Accordingly, the battery capacity can be used without waste.

(3) When A.C. adaptor 21 is connected to connector 22 of power supply device 20 but is not connected to plug socket In this case, although power supply from the external D.C. power supply does not exist, the contact 28 of the connector 22 is turned OFF, and the negative electrode of the secondary battery 25 is cut off from the ground. If the state remains as such, power is not supplied from either the external D.C. power supply or the secondary battery 25 to the DC-DC convertor 24, and the load undergoes an interruption of power. The switch circuit 27 is disposed in order to prevent such service interruption. Since the voltage of the external D.C. power supply is not detected, the comparator 44 of the external input voltage detection unit 42 outputs the H signal and turns ON the switching transistor Tr4 of the switch circuit 27. Consequently, a circuit comprising the ground—switching transistor Tr4—diode D6 secondary battery 25—DC-DC convertor 24 is formed. Therefore, the secondary battery 25 is connected to the input side of the DC-DC convertor 24. The DC-DC convertor 24 converts the voltage supplied from the secondary battery 25 to a constant voltage and supplies it to the load. At this time, power consumption occurs in the switching diode D6, but the supply of power to the load continues as such and an interruption does not occur. When the AC adaptor 21 is removed from the connector 22 under this state, the contact 28 is turned ON, the output of the secondary battery 25 is directly inputted to the DC-DC convertor 24, and power consumption in the diode D6 does not exist any longer.

When the voltage of the external D.C. power supply is not detected, the comparator 43 of the external input voltage detection unit 42 outputs the L signal. Therefore, the microcomputer 46 does not output the control signal to the charge control unit 30.

Figure 4:
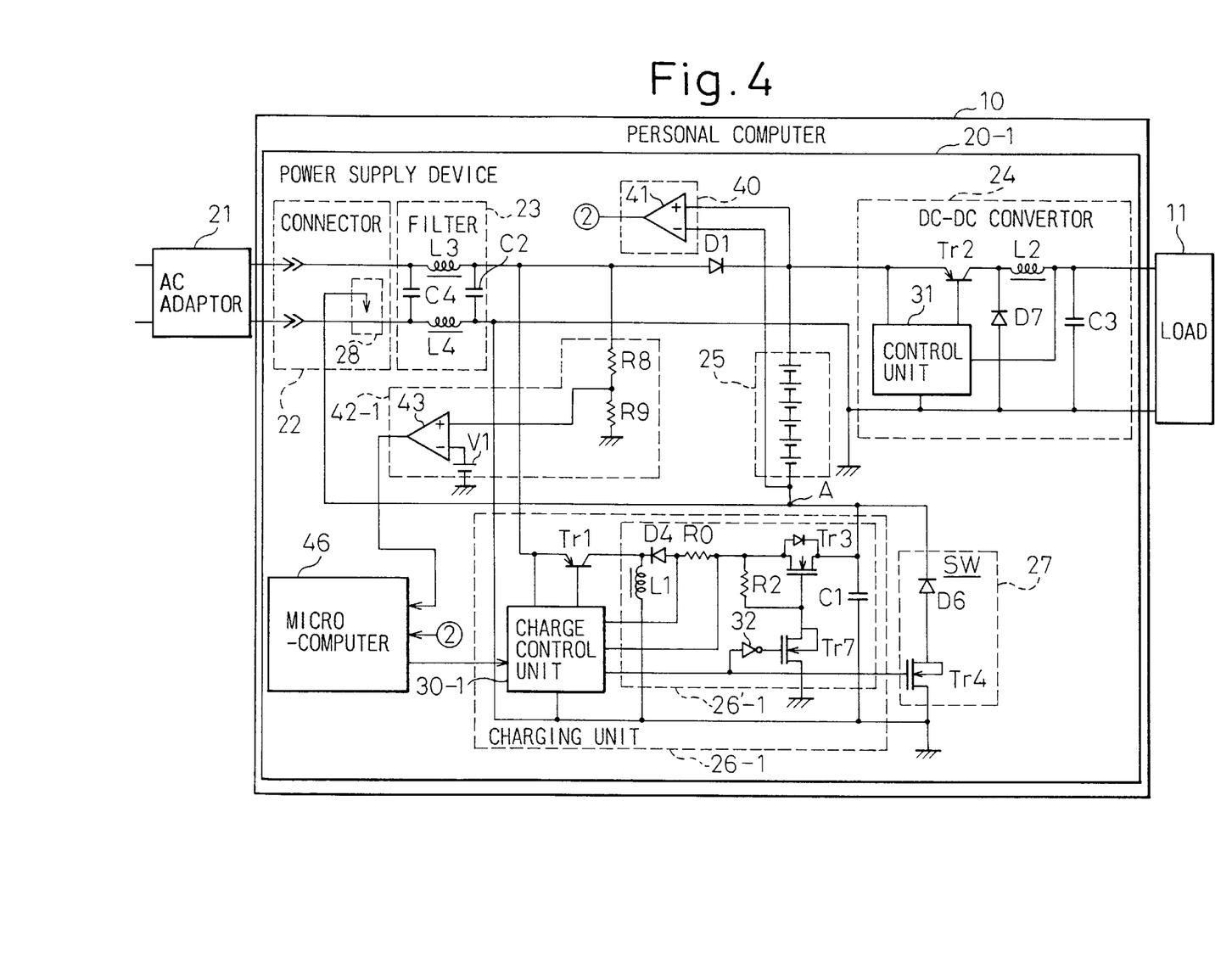
FIG. 4 is a circuit diagram of the second embodiment of the present invention.

FIG. 4 is a circuit diagram of the second embodiment of the present invention. The circuit shown in FIG. 4 eliminates one (44) of the comparators of the external input voltage detection unit 42 by modifying the charge portion 26 of the circuit shown in FIG. 2. In the following description of FIG. 4, like reference numerals will be used to identify like constituents having the same function as in FIG. 1, and an overlap of explanations will be omitted.

In the power supply device 20-1, the external input voltage detection unit 42-1 has only one comparator 43. The comparator 43 outputs the H signal when the AC adaptor 21 is connected and the voltage of the external D.C. power supply is detected, and outputs the L signal when this voltage is not outputted. The output signal of the comparator 43 is inputted to the microcomputer 46. When the adaptor 21 is connected, the voltage of the external D.C. power supply is detected and moreover, the voltage of the secondary battery 25 drops, the microcomputer 46 outputs the control signal instructing the operation to the charge control unit 30-1 of the charge portion 26-1. The control signal outputted by the charge control portion 30-1 is inputted to the gate of the switching transistor Tr3 through the inverter 32 and the transistor Tr7 of the negative voltage generation unit 26'-1. At the same time, the control signal is inputted to the gate of the switching transistor Tr4 of the switch circuit 27.

The operation of the circuit shown in FIG. 4 is substantially the same as that of the circuit shown in FIG. 1. Therefore, the following explanation will be directed to only the difference from the circuit operation shown in FIG. 1.

(1) When an external D.C. power supply is used

When the control signal indicating charge is inputted from the microcomputer 46, the charge control unit 30-1 turns ON the switching transistor Tr3 through the inverter 32 and the transistor Tr7. At the same time, the switching transistor Tr4 of the switch circuit 27 is turned OFF.

(2) When secondary cell 25 is used as power supply and (3) When A.C. adaptor 21 is connected to connector 22 but not connected to plug socket The switching transistor Tr4 is turned ON/OFF by the signal from the charge control unit 30-1 but not by the signal from the comparator 44.

Figure 5:
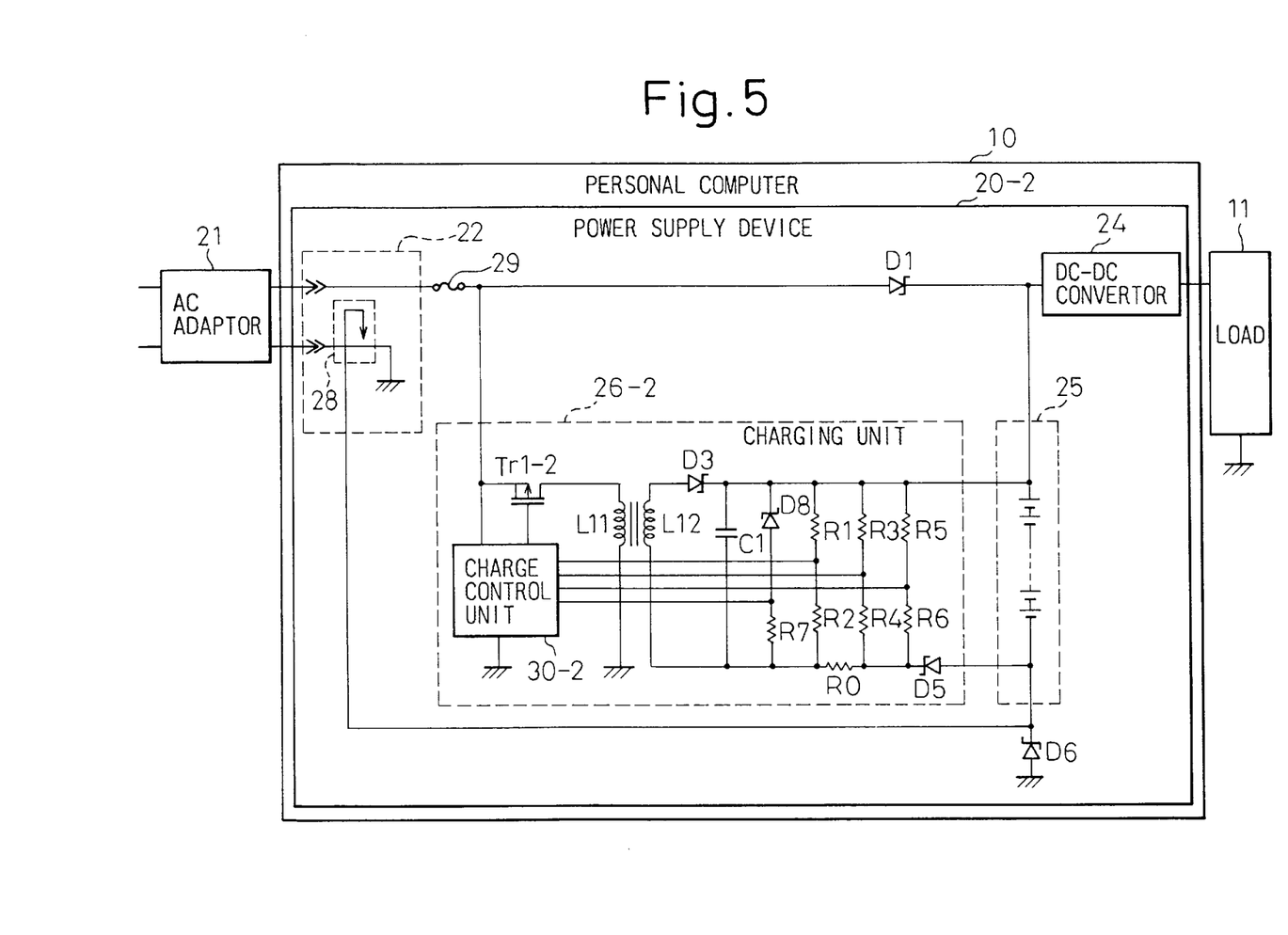
FIG. 5 is a circuit diagram of the third embodiment of the present invention.

FIG. 5 is a circuit diagram of the third embodiment of the present invention. In FIG. 5, the circuit constituent members such as the personal computer 10, the load 11, the A.C. adaptor 21, the connector 22, the DC-DC convertor 24, the secondary battery 25 and the back-flow prevention diode D1 are the same as those shown in FIG. 1, and the detailed explanation will be omitted. In the power supply device 20-2, only the switching diode D6 is interposed between the negative electrode and the ground, but the switching transistor is not connected.

Reference numeral 26-2 denotes a charge unit. In the charge unit 26-2, reference numeral 30-2 denotes a charge control unit. Since the content of this charge control unit 30-2 is well known in the art, its explanation will be omitted. A commercially available IC can be used for the charge control unit 30-2, for example. Reference symbol Tr1-2 denotes a control transistor, and a p-type MOSFET is used. Symbols L11 and L12 denote primary and secondary windings of a voltage conversion transformer. Symbol D3 denotes a rectification diode, and C1 denotes a smoothing capacitor for a D.C. output. Symbol R0 is a current detection resistor, and symbols R1 and R2 denote voltage divider resistors. These resistors divide the voltage on the current outflow side of the current detection resistor R0. Symbols R3 and R4 denote voltage divider resistors, and they divide the voltage on the current inflow side of the current detection resistor R0. Symbols R5 and R6 denote voltage divider resistors for detecting the output voltage. A diode D8 and a resistor R7 generate a reference voltage. Symbol D5 denotes a back-flow prevention diode, and reference numeral 29 denotes a fuse.

Next, the operation of the circuit shown in FIG. 5 will be explained.

(1) When external D.C. power supply is used

When the A.C. adaptor 21 is fitted into the plug socket of the commercial power supply and is connected to the connector 22, the contact 28 of the connector 22 is turned OFF. The external D.C. power supply is connected to the input side of the DC-DC convertor 24. The secondary battery 25 is connected to the input side of the DC-DC convertor 24 through the route comprising the ground—switching diode D6—secondary battery 25—DC-DC convertor 24. Because the voltage of the external D.C. power supply is set to a higher level than the voltage of the secondary battery 25, only the voltage of the external D.C. power supply is inputted to the input of the DC-DC convertor 24. The DC-DC convertor 24 converts the voltage of the external D.C. power supply to the constant voltage and supplies it to the load. A current cannot flow from the external D.C. power supply into the secondary battery 25 because it is inhibited by the switching transistor D6.

The charge control unit 30-2 executes ON/OFF control of the charge transistor Tr1-2 when the voltage of the external D.C. power supply is supplied thereto. Accordingly,, the external D.C. power supply is converted to an A.C. voltage and is supplied to the primary winding L11 of the transformer. The A.C. voltage transmitted to the secondary winding L12 of the transformer is converted to a D.C. voltage by the rectification diode D3, and charges the secondary battery 25. The charge control unit 30-2 regulates the ON/OFF period of the transistor Tr1-2 on the basis of the charging current determined by the resistors R0, R1, R2, R3 and R4, the voltage of the secondary battery 25 due to the resistors R5 and R6, and the reference voltage due to the diode D4 and the resistor R7, so that the charging current attains the constant value. Since the operation of the charge control unit 30-2 is well known, its explanation will be hereby omitted. The charge portion 26-2 regulates the voltage of the negative electrode of the secondary battery 25 and executes its charging operation from the external D.C. power supply.

In the circuit explained above, the charge portion 26-2 is electrically insulated by the transformer. Therefore, the output voltage of the charge portion 26-2 is separated from the ground voltage of the device. Accordingly, the charging operation can be controlled by controlling the voltage of the negative electrode of the secondary battery 25. By the way, the potential of the negative electrode of the secondary battery 25 does not drop below the ground potential during charging; hence, the current does not flow from the ground through the diode D6. In other words, the switching transistor need not be disposed in series with the diode D6 as in the circuit shown in FIG. 1.

While the external D.C. power supply is supplied to the power supply device 20-2, the contact 28 which connects the negative electrode of the secondary battery 25 and the ground is turned OFF, and the switching diode D6 has the reverse polarity. Therefore, the current does not directly flow from the external D.C. power supply to the secondary battery 25, and the back-flow prevention diode need not be interposed between the load and the secondary battery 25.

(2) When secondary battery 25 is used as power supply

When the A.C. adaptor 21 is removed from the connector 22, the contact 28 is turned ON, and the negative electrode of the secondary battery 25 is connected to the ground. Accordingly, only the voltage of the secondary battery 25 is inputted to the DC-DC convertor. This DC-DC convertor 24 converts the output voltage of the secondary battery 25 to the constant voltage and outputs it to the load. At this time, since the back-flow prevention diodes D1 and D5 exist, the current does not flow from the secondary battery 25 to the external input voltage detection unit 42, etc. on the external D.C. power supply side.

The secondary battery 25 is directly connected to the input side of the DC-DC convertor 24 without passing the back-flow prevention diode. Therefore, power consumption in a back-flow prevention diode interposed between the secondary battery and the load does not occur, unlike the prior art devices. In other words, the battery capacity can be fully used.

(3) When the A.C. adaptor 21 is connected to connector 22 but is not connected to plug socket The contact 28 of the connector 22 is OFF. However, since the circuit comprising the ground—switching—diode D6—secondary battery 25—DC-DC convertor 24 is formed, the secondary battery 25 is connected to the input side of the DC-DC convertor 24. The DC-DC convertor 24 converts the voltage supplied from the secondary battery 25 to the constant voltage and outputs it to the load. At this time, power consumption occurs in the diode D6, but because the supply of power to the load is continued, interruption of power does not occur.

Figure 6:
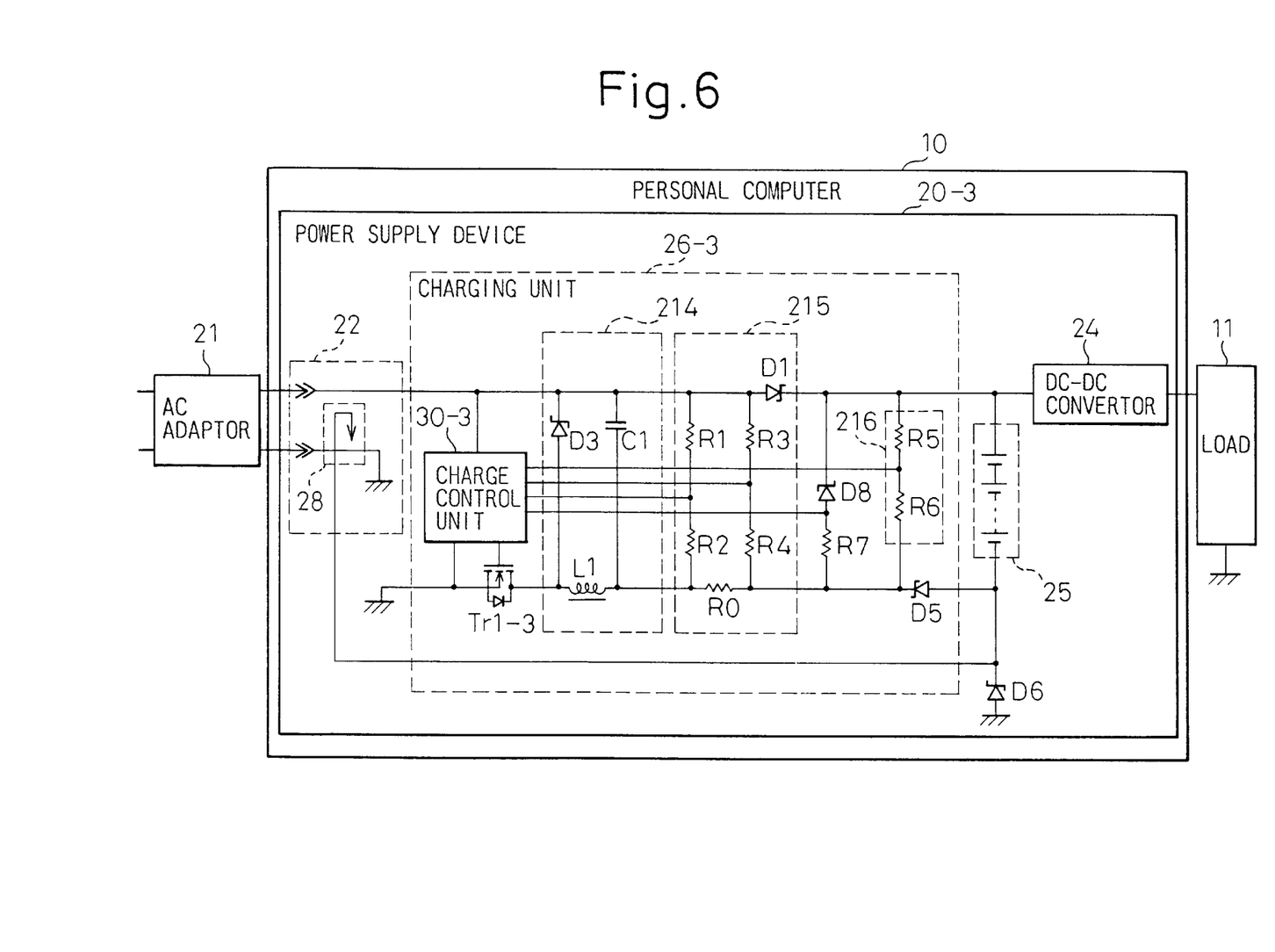
FIG. 6 is a circuit diagram of the fourth embodiment of the present invention.

FIG. 6 is a circuit diagram of the fourth embodiment of the present invention. In FIG. 6, the personal computer 10, the load 11, the A.C. adaptor 21, the connector 22, the DC-DC convertor 24, the secondary battery 25, the back-flow prevention diodes D1, D5 and the switching diode D6 are the same as those shown in FIG. 5. Therefore, the detailed explanation of these components will be omitted.

In the power supply device 20-3, reference numeral 26-3 denotes a charge portion. In this charge portion 20-3, reference numeral 30-3 denotes a charge control unit. Symbol Tr1-3 denotes an n-type MOSFET control transistor. This transistor is controlled by the charge control unit 30-3 and conducts the ON/OFF operation. Reference numeral 214 denotes a charge voltage generation unit. In this charge voltage generation portion 214, reference symbol L1 denotes a choke coil. Symbol C1 denotes a smoothing capacitor and symbol D3 denotes a flyback diode. Reference numeral 215 denotes a current detection unit. In the current detection unit 215, symbols R0, R1, R2, R3 and R4 denote current detection resistors constituted in the same way as in the circuit shown in FIG. 5. Reference numeral 216 denotes a voltage detection unit. In the voltage detection unit 216, resistors R5 and R6 are voltage divider resistors for detecting the output voltage in the same way as in the circuit shown in FIG. 5. A resistor R7 and a diode D8 together generate a reference voltage in the same way as in the circuit shown in FIG. 5.

Next, the operation of the circuit shown in FIG. 6 will be explained.

(1) When external D.C. power supply is used

When the A.C. adaptor 21 is fitted into the plug socket of the commercial power supply and is connected to the connector 22, the contact 28 of the connector 22 is turned OFF. The external D.C. power supply and the secondary battery 25 are connected to the input side of the DC-DC convertor 24. Because the voltage of the external D.C. power supply is set to a higher level than the voltage of the secondary battery 25, only the voltage of the external D.C. power supply is inputted to the input of the DC-DC convertor 24. The DC-DC convertor 24 converts the voltage of the external D.C. power supply to the constant voltage and supplies it to the load. A current cannot flow from the external D.C. power supply to the secondary battery 25 because it is checked by the switching transistor D6.

The charge control unit 30-3 executes the ON/OFF control of the control transistor Tr1-3 when the voltage of the external D.C. power supply is supplied. When the control transistor Tr1-3 is ON, the current from the external D.C. power supply flows through the route comprising the diode D1—secondary battery 25—diode D5—current detection resistor R0—choke coil L1—control transistor Tr1-3. When the control transistor Tr1-3 is OFF, energy accumulated in the choke coil L1 flows through the route comprising the flyback diode D3—diode D1—secondary battery 25—diode D5—current detection resistor R0—choke coil L1, and charges the secondary battery 25. The charge control unit 30-3 regulates the ON/OFF period of the control transistor Tr1-3 on the basis of the voltage and the current detected by the current detection portion 215 and the voltage detection portion 216, and executes control so that the charging current attains a constant value. Since the operation of the charge control unit 30-3 is well known in the art, an explanation will be omitted. Incidentally, since the voltage of the negative electrode of the secondary battery 25 does not become lower than the ground voltage during the charging operation, the current does not flow from the ground through the diode D6. Accordingly, the switching transistor need not be disposed in series with the diode D6 as was necessary in the circuit shown in FIG. 1.

While the external D.C. power supply is supplied to the power supply device 20-3, the contact 28 which connects the negative electrode of the secondary battery 25 to the ground is turned OFF, and the switching diode D6 has the opposite polarity. Therefore, the current does not directly flow from the external D.C. power supply to the secondary battery 25. This means that a back-flow prevention diode need not be interposed between the load and the secondary battery 25.

(2) When secondary battery 25 is used as the power supply

When the A.C. adaptor 21 is removed from the connector 22, the contact 28 is turned ON and the negative electrode of the secondary battery 25 is connected to the ground. Accordingly, only the voltage of the secondary battery 25 is inputted to the DC-DC convertor 24. This DC-DC convertor 24 converts the output voltage of the secondary battery 25 to a predetermined voltage and outputs it to the load. At this time, since the back-flow prevention diodes D1 and D5 exist, the current does not flow from the secondary battery 25 to the current detection portion 215, etc. on the external D.C. power supply side.

Since the secondary battery 25 is directly connected to the input side of the DC-DC convertor 24 without passing through a back-flow prevention diode, power consumption does not occur in a back-flow prevention diode disposed between the secondary battery and the load, as has been observed in the power supply devices according to the prior art. For this reason, the battery capacity can be fully used without waste.

(3) When A.C. adaptor 21 is connected to connector 22 but is not connected to plug socket Though the contact 28 of the connector 22 is OFF, the secondary battery 25 is connected to the input side of the DC-DC convertor 24 because the circuit comprising the ground—switching diode D6—secondary battery 25—DC-DC convertor 24 is formed. The DC-DC convertor 24 converts the voltage supplied from the secondary battery 25 to the predetermined voltage and outputs it to the load. At this time, power consumption occurs in the diode D6, but an interruption of power supply does not occur because the power supply to the load is continued.

In the circuit of FIG. 6 explained above, the control transistor Tr1-3 of the charge portion 26-3 is connected to the negative electrode side. Therefore, a signal having a positive polarity can be applied to the gate. For this reason, an n-type MOSFET can be used as the transistor. Since the n-type MOSFET has a smaller ON resistance than a p-type MOSFET, power consumption in the charge portion 26-3 can be reduced.

Figure 7:
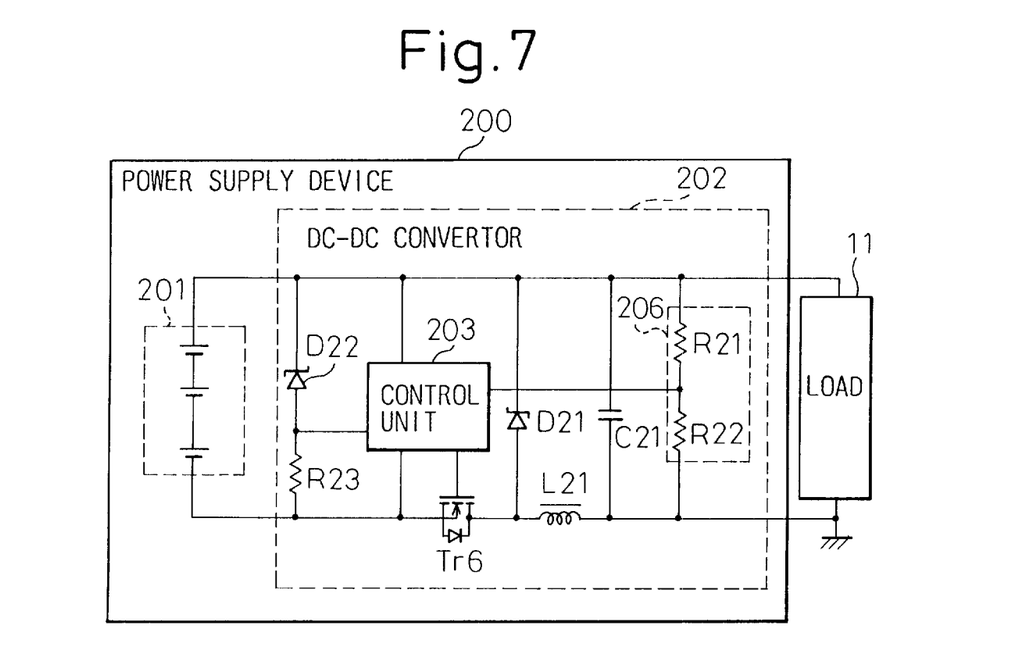
FIG. 7 is a circuit diagram of the fifth embodiment of the present invention.

FIG. 7 is a circuit diagram of the seventh embodiment of the present invention. The circuit of FIG. 6 described above reduces the power consumption of the power supply device by using the n-type MOSFET having a low ON resistance for the control transistor. On the other hand, the circuit shown in FIG. 7 uses the n-type MOSFET for the control transistor of the DC-DC convertor so as to reduce power consumption in the DC-DC convertor, as well.

In FIG. 7, reference numeral 200 denotes a power supply device, and reference numeral 201 denotes a battery. Besides the secondary battery, a primary battery such as a dry battery can be used for the battery 201. Reference numeral 202 denotes a DC-DC convertor, and reference numeral 11 denotes a load. In the DC-DC convertor 202, symbol Tr6 denotes a control transistor, symbol L21 denotes a choke coil, symbol C21 denotes a capacitor, and symbol D21 denotes a flyback diode. Symbols R21 and R22 denote voltage divider resistors for detecting a voltage. A constant voltage diode D22 and a resistor R23 generate a reference voltage. Reference numeral 203 denotes a control unit, which detects the output voltage and keeps the output voltage constant by executing the ON/OFF control of the control transistor Tr6. Since the content of this control unit 203 is well known, its detailed explanation will be omitted. For example, a commercially available IC can be used for the control unit 203.

Next, the operation of the circuit shown in FIG. 7 will be explained.

Receiving the supply of the output voltage of the battery, the control unit 203 starts its operation. The output voltage obtained by the voltage divider resistors R21, R22 and the reference voltage obtained from the constant voltage diode D22 are compared with each other, and the control transistor Tr6 is turned ON when the output voltage is lower, and is turned OFF when the output voltage is higher. When the control transistor Tr6 is turned ON, power is supplied from the battery 201 to the load 11 and at the same time, energy is stored in the choke coil 11. When the control transistor Tr6 is turned OFF, energy stored in the choke coil L21 causes a current to flow through the circuit comprising the choke coil L21—flyback diode D21—capacitor C21, and the current is supplied to the load 11. The control unit 203 controls the output voltage of the voltage conversion portion 202 to a constant value by regulating the ON/OFF period of the control transistor Tr6.

The circuit shown in FIG. 7 can reduce the internal resistance of the power supply device by using the n-type MOSFET as the switching device, and can reduce power consumption.

Figure 8:
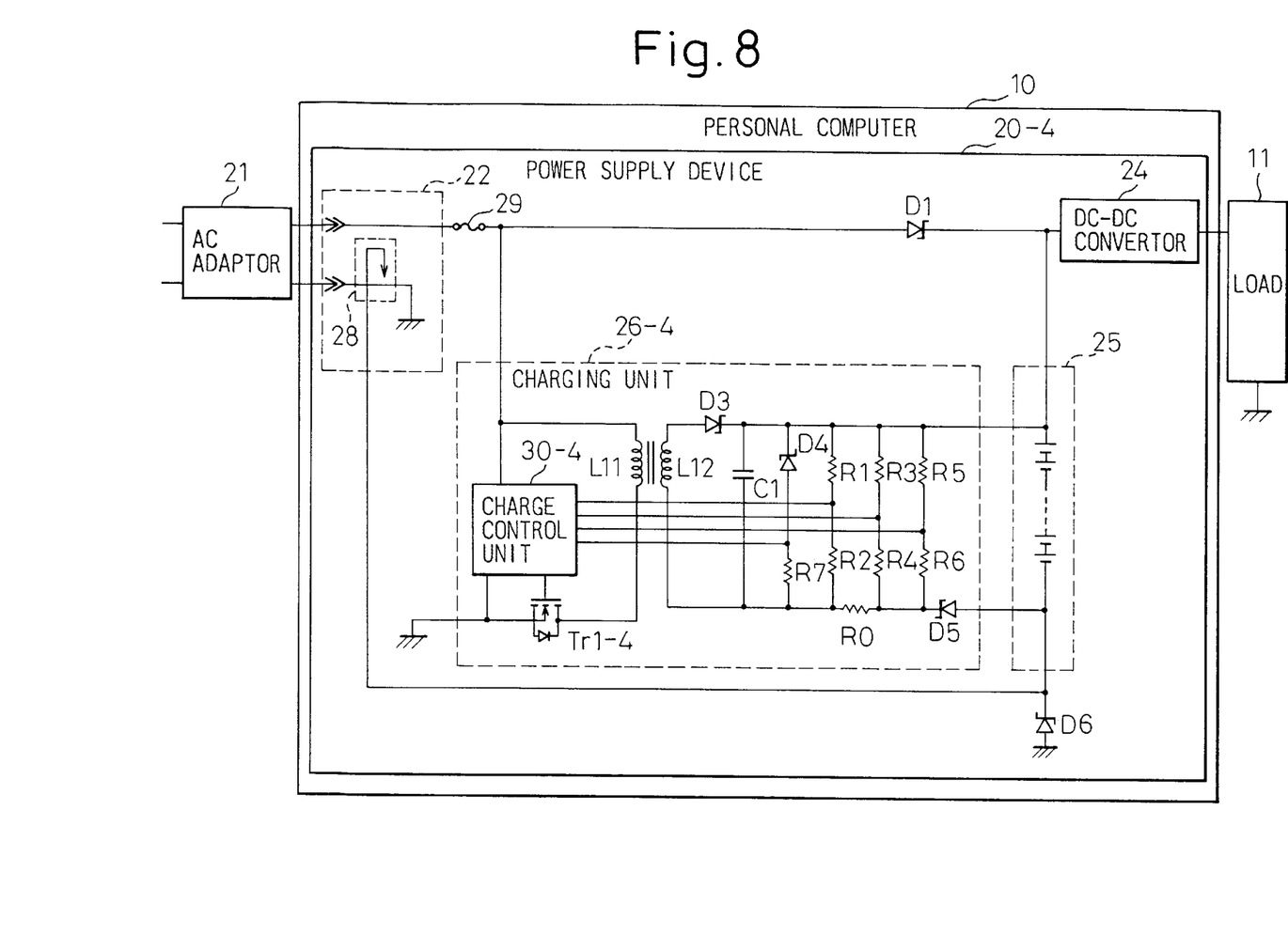
FIG. 8 is a circuit diagram of the sixth embodiment of the present invention.

FIG. 8 is a circuit diagram of the sixth embodiment of the present invention. In FIG. 8, the personal computer 10, the load 11, the A.C. adaptor 21, the connector 22, the DC-DC convertor 24, the secondary battery 25, the back-flow prevention diodes D1, D5 and the switching diode D6 are the same as those shown in FIG. 5, and their detailed explanation will be omitted.

In the power supply device 20-4, reference numeral 26-4 denotes a charge portion. This charge portion is the same as the charge portion shown in FIG. 5 with the exception that the connecting position of the control transistor is different. The control transistor Tr1-4 shown in FIG. 8 is interposed between the primary winding L11 of the transformer and the ground. Since the rest of the circuit construction are the same as those of FIG. 5, an explanation will be omitted.

Since the operation of the circuit shown in FIG. 8 is the same as the operation of the circuit shown in FIG. 5, it is covered by the explanation of the circuit operation of FIG. 5. The circuit shown in FIG. 8 can use the n-type MOSFET having a low ON resistance for the control transistor. Therefore, this circuit can reduce power consumption in the switching device and can improve efficiency of the power supply device 20.

We claim:

1. A power supply device for supplying a voltage from an external D.C. power supply to an output and for charging a secondary battery with the external D.C. power supply, said power supply device comprising:

an input terminal for connecting an external D.C. power supply;

an output terminal;

a first connection means for connecting a positive side of said input terminal and a positive side of said output terminal to a positive side of the secondary battery;

a second connection means for connecting a negative side of said input terminal and a negative side of said output terminal;

a third connection means connected between a negative side of the secondary battery and the negative side of said input terminal, and being turned OFF when charging the secondary battery; and a charge portion having means for controlling the voltage on the negative side of the secondary battery, for charging said secondary battery by said external D.C. power supply.

2. A power supply device for supplying a voltage from an external D.C. power supply to an output and for charging a secondary battery with the external D.C. power supply, said power supply device comprising:

a connector for connecting an external D.C. power supply;

an output terminal;

a first connection means for connecting a positive side of said connector and a positive side of said output terminal to a positive side of the secondary battery;

a second connection means for connecting a negative side of said connector and a negative side of said output terminal;

a third connection means connected between the negative side of the secondary battery and the negative side of said connector, and being turned OFF when charging the secondary battery;

a switch circuit interposed between the negative side of the secondary battery and the negative side of said connector, and including a switching diode connected in the same polarity as the secondary battery and a switching transistor being turned OFF when charging the secondary battery; and a charge portion for charging the secondary battery by said external D.C. power supply, interposed between the negative side of the secondary battery and the negative side of said connector, having negative voltage generation means for setting the voltage on the negative side of the secondary battery to a level lower than that of the negative side of said connector.

3. A power supply device according to claim 2, which further comprises a back-flow prevention diode connected between said connector and the positive side of said secondary battery.

4. A power supply device according to claim 2, which further comprises a DC-DC convertor for regulating the voltage outputted to said output terminal to a predetermined voltage.

5. A power supply device according to claim 2, wherein said third connection means is assembled into said connector.

6. A power supply device according to claim 2, wherein said charge portion includes a control transistor connected between said connector and said negative voltage generation means, and a charge control portion for executing the ON/OFF control of said control transistor.

7. A power supply device according to claim 6, which further comprises means for detecting a charging current of said charge portion, and wherein said charge control portion executes the ON/OFF control of said control transistor so as to keep said charging current at a constant value.

8. A power supply device according to claim 6, which further comprises:
   means for detecting the voltage of said external D.C. power supply; and
   means for detecting the voltage of said secondary battery; and wherein, when the voltage of said external D.C. power supply is detected and when the voltage of said secondary battery drops below the reference value, said charge control portion starts the ON/OFF control of said control transistor.

9. A power supply device according to claim 8, which further comprises means for turning OFF said switching transistor of said switch circuit when the voltage of said external D.C. power supply is detected.

10. A power supply device according to claim 8, wherein said charge control portion turns OFF said switching transistor of said switch circuit when the voltage of said external D.C. power supply is detected.

11. A power supply device for supplying a voltage from an external D.C. power supply to an output and for charging a secondary battery with the external D.C. power supply, said power supply device comprising:
   a connector for connecting an external D.C. power supply;
   an output terminal;
   a first connection means for connecting a positive side of said connector and a positive side of said output terminal to a positive side of the secondary battery;
   a second connection means for connecting a negative side of said connector and a negative side of said output terminal;
   a third connection means connected between a negative side of the secondary battery and the negative side of said connector, and being turned OFF when charging the secondary battery;
   a switching diode connected in the same polarity as the secondary battery between the negative side of the secondary battery and the negative side of said connector; and
   a charge portion having a DC-AC conversion portion, a transformer and an AC-DC conversion portion, and charging the secondary battery from said external D.C. power supply.

12. A power supply device according to claim 11, which further comprises a back-flow prevention diode connected between said connector and the positive side of said secondary battery.

13. A power supply device according to claim 11, which further comprises a DC-DC convertor for regulating the voltage outputted to said output terminal to a predetermined voltage.

14. A power supply device according to claim 11, wherein said third connection means is assembled into said connector.

15. A power supply device according to claim 11, wherein said DC-AC conversion portion of said charge portion includes a control transistor connected between said connector and a primary winding of said transformer, and a charge control portion for executing the ON/OFF control of said control transistor.

16. A power supply device according to claim 15, which further comprises:
   means for detecting a charging current of said charge portion; and
   means for detecting the voltage of said secondary battery; and wherein:
      said charge control portion executes the ON/OFF control of said control transistor on the basis of said charging current or the voltage of said secondary battery.

17. A power supply device according to claim 15, wherein said control transistor is an n-type MOSFET connected between the negative side of said secondary battery and the negative side of said connector.

18. A power supply device for supplying a voltage from an external D.C. power supply to an output and for charging a secondary battery with the external D.C. power supply, said power supply device comprising:
   a connector for connecting an external D.C. power supply;
   an output terminal;
   a first connection means for connecting a positive side of said connector and a positive side of said output terminal to a positive side of the secondary battery;
   a second connection means for connecting a negative side of said connector and a negative side of said output terminal;
   a third connection means connected between a negative side of said secondary battery and the negative side of said connector, and being turned OFF when charging the secondary battery;
   a switching diode connected in the same polarity as the secondary battery between the negative side of the secondary battery and the negative side of said connector; and
   a charge portion for charging the secondary battery, having a control transistor connected between the negative side of the secondary battery and the negative side of said connector, and a charge control portion for executing the ON/OFF control of said control transistor.

19. A power supply device according to claim 18, which further comprises a back-flow prevention diode connected between said connector and the positive side of said secondary battery.

20. A power supply device according to claim 18, which further comprises a DC-DC convertor for regulating the voltage outputted to said output terminal to a constant voltage.

21. A power supply device according to claim 18, wherein said contact is assembled into said connector.

22. A power supply device according to claim 18, wherein said control transistor is an n-type MOSFET.

23. A power supply device comprising:
   a battery;
   an output terminal; and
   a DC-DC convertor including:
      connection means for connecting a positive side of said battery and a positive side of said output terminal;
      a control transistor connected between a negative side of said battery and a negative side of said output terminal; and
      a control portion for executing control so as to keep the output voltage of said DC-DC convertor constant by executing the ON/OFF control of said control transistor.

24. A power supply device according to claim 23, wherein said control transistor is an n-type MOSFET.

25. An electronic appliance including a power supply device for supplying a voltage from an external D.C. power supply to an output and for charging a secondary battery with the external D.C. power supply, said power supply device comprising:

an input terminal for connecting an external D.C. power supply;

an output terminal;

a first connection means for connecting a positive side of said input terminal and a positive side of said output terminal to a positive side of the secondary battery;

a second connection means for connecting a negative side of said input terminal and a negative side of said output terminal;

a third connection means connected between the negative side of the secondary battery and the negative side of said input terminal, and being turned OFF when charging the secondary battery; and a charge portion having means for controlling the voltage of the negative side of the secondary battery, and charging the secondary battery by said external D.C. power supply.

26. An electronic appliance, including a power supply device for supplying a voltage from an external D.C. power supply to an output and for charging a secondary battery with the external D.C. power supply, said power supply device, comprising:

a connector for connecting an external D.C. power supply;

an output terminal;

a first connection means for connecting a positive side of said connector and a positive side of said output terminal to a positive side of the secondary battery;

a second connection means for connecting a negative side of said connector and a negative side of said output terminal;

a third connection means connected between the negative side of said secondary battery and the negative side of said connector, and being turned OFF when charging the secondary battery;

a switch circuit interposed between the negative side of the secondary battery and the negative side of said connector, and including a switching diode connected in the same polarity as said secondary battery and a switching transistor being turned OFF when charging the secondary battery; and a charge portion interposed between the negative side of the secondary battery and the negative side of said connector, including negative voltage generation means for setting the voltage on the negative side of said secondary battery to a level lower than that of the negative side of said connector, and charging the secondary battery by said external D.C. power supply.

27. An electronic appliance according to claim 26, which further comprises a back-flow prevention diode connected between said connector and the positive side of said secondary battery.

28. An electronic appliance according to claim 26, which further comprises a DC-DC convertor for regulating the voltage outputted to said output terminal to a predetermined voltage.

29. An electronic appliance according to claim 26, wherein said third connection means is assembled into said connector.

30. An electronic appliance according to claim 26, wherein said charge portion includes a control transistor connected between said connector and said negative voltage generation means, and a charge control portion for executing the ON/OFF control of said control transistor.

31. An electronic appliance according to claim 30, which further comprises means for detecting a charging current of said charge portion, and wherein said charge control portion executes the ON/OFF control of said control transistor so as to keep said charging current at a constant value.

32. An electronic appliance according to claim 30, which further comprises:

means for detecting the voltage of said external D.C. power supply; and means for detecting the voltage of said secondary battery; and wherein:

said charge control portion starts the ON/OFF control of said control transistor when the voltage of said external D.C. power supply is detected and the voltage of said secondary battery drops below a reference value.

33. An electronic appliance according to claim 32, which further comprises means for turning OFF said switching transistor of said switch circuit when the voltage of said external D.C. power supply is detected.

34. An electronic appliance according to claim 32, wherein said charge control portion turns OFF said switching transistor of said switch circuit when the voltage of said external D.C. power supply is detected.

35. An electronic appliance including a power supply device for supplying a voltage from an external D.C. power supply to an output and for charging a secondary battery with the external D.C. power supply, said power supply device comprising:

a connector for connecting an external D.C. power supply;

an output terminal;

a first connection means for connecting a positive side of said connector and a positive side of said output terminal to a positive side of the secondary battery;

a second connection means for connecting a negative side of said connector and a negative side of said output terminal;

a third connection means connected between the negative side of the secondary battery and the negative side of said connector, and being turned OFF when charging the secondary battery;

a switching diode connected in the same polarity as the secondary battery between the negative side of the secondary battery and the negative side of said connector; and a charge portion having a DC-AC conversion portion, a transformer and an AC-DC conversion portion, and charging the secondary battery by said external D.C. power supply.

36. An electronic appliance according to claim 35, which further comprises a back-flow prevention diode connected between said connector and the positive side of said secondary battery.

37. An electronic appliance according to claim 35, which further comprises a DC-DC convertor for regulating the voltage outputted to said output terminal to a predetermined voltage.

38. An electronic appliance according to claim 35, wherein said third connection means is assembled into said connector.

39. An electronic appliance according to claim 35, wherein said DC-AC conversion portion of said charge portion includes a control transistor connected between said connector and a primary winding of said transformer, and a charge control portion for executing the ON/OFF control of said control transistor.

40. An electronic appliance according to claim 39, which further comprises:
   means for detecting a charging current of said charge portion; and
   means for detecting the voltage of said secondary battery; and wherein:
      said charge control portion executes the ON/OFF control of said control transistor on the basis of said charging current or the voltage of said secondary battery.

41. An electronic appliance according to claim 39, wherein said control transistor is an n-type MOSFET connected between the negative side of said secondary battery and the negative side of said connector.

42. An electronic appliance including a power supply device for supplying a voltage from an external D.C. power supply to an output and for charging a secondary battery with the external D.C. power supply, said power supply device comprising:
   a connector for connecting an external D.C. power supply;
   an output terminal;
   a first connection means for connecting a positive side of said connector and a positive side of said output terminal to a positive side of the secondary battery;
   a second connection means for connecting a negative side of said connector and a negative side of said output terminal;
   a third connection means connected between the negative side of the secondary battery and the negative side of said connector, and being turned OFF when charging the secondary battery;
   a switching diode connected in the same polarity as the secondary battery between the negative side of the secondary battery and the negative side of said connector; and
   a charge portion including a control transistor connected between the negative side of the secondary battery and the negative side of said connector, and a charge control portion for executing the ON/OFF control of said control transistor, and charging the secondary battery by said external D.C. power supply.

43. An electronic appliance according to claim 42, which further includes a back-flow prevention diode connected between said connector and the positive side of said secondary battery.

44. An electronic appliance according to claim 42, which further comprises a DC-DC convertor for regulating the voltage outputted to the output terminal to a constant voltage.

45. An electronic appliance according to claim 42, wherein said third connection means is assembled into said connector.

46. An electronic appliance according to claim 42, wherein said control transistor is an n-type MOSFET.

47. An electronic appliance including a power supply device comprising:
   a battery;
   an output terminal; and
   a DC-DC convertor including:
      connection means for connecting a positive side of said battery and a positive side of said output terminal;
      a control transistor connected between a negative side of said battery and a negative side of said output terminal; and
      a control portion executing the ON/OFF control of said control transistor so as to keep the output voltage of said DC-DC convertor constant.

48. An electronic appliance according to claim 47, wherein said control transistor is an n-type MOSFET.

49. A power supply device as recited in claim 1, wherein said third connection means is turned OFF when said external D.C. power supply for use in charging the secondary battery is connected to said input terminal.

50. A power supply device as recited in claim 2, wherein said third connection means is turned OFF when said external D.C. power supply for use in charging the secondary battery is connected to said connector.

51. A power supply device as recited in claim 11, wherein said third connection means is turned OFF when said external D.C. power supply for use in charging the secondary battery is connected to said connector.

52. A power supply device as recited in claim 18, wherein said third connection means is turned OFF when said external D.C. power supply for use in charging the secondary battery is connected to said connector.

53. An electronic appliance as recited in claim 25, wherein said third connection means is turned OFF when said external D.C. power supply for use in charging the secondary battery is connected to said input terminal.

54. An electronic appliance as recited in claim 26, wherein said third connection means is turned OFF when said external D.C. power supply for use in charging the secondary battery is connected to said connector.

55. An electronic appliance as recited in claim 35, wherein said third connection means is turned OFF when said external D.C. power supply for use in charging the secondary battery is connected to said connector.

56. An electronic appliance as recited in claim 42, wherein said third connection means is turned OFF when said external D.C. power supply for use in charging the secondary battery is connected to said connector.

57. A power supply device, comprising:
   secondary battery connection means for connecting a secondary battery thereto;
   an input terminal for connecting an external D.C. power supply;
   an output terminal;
   a first connection means for connecting a positive side of said input terminal and a positive side of said output terminal to a positive side of said secondary battery connection means;
   a second connection means for connecting a negative side of said input terminal and a negative side of said output terminal;
   a third connection means connected between a negative side of said secondary battery connection means and the negative side of said input terminal, and being turned OFF when charging current is flowing through said secondary battery connection means; and
   a charge portion having means for controlling a voltage on the negative side of the secondary battery connection means, for directing a charging current through said secondary battery connection means by the external D.C. power supply.

58. A power supply device, comprising:
   secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of said secondary battery connection means and the negative side of said connector, and being turned OFF when charging current is flowing through said secondary battery connection means; and a charge portion having means for controlling a voltage on the negative side of the secondary battery connection means, for directing a charging current through said secondary battery connection means by the external D.C. power supply.

59. A power supply device, comprising:

secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of the secondary battery connection means and the negative side of said connector, and being turned OFF when a charging current flows through said secondary battery connection means;

a switching diode connected in the same polarity as said secondary battery connection means between the negative side of said secondary battery connection means and the negative side of said connector; and a charge portion having a DC-AC conversion portion, a transformer and an AC-DC conversion portion, and directing a charging current through said secondary battery connection means from said external D.C. power supply.

60. A power supply device, comprising:

secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of the secondary battery connection means and the negative side of said connector, and being turned OFF when a charging current flows through said secondary battery connection means;

a switching diode connected in the same polarity as said secondary battery connection means between the negative side of said secondary battery connection means and the negative side of said connector; and a charge portion for directing a charging current to said secondary battery connection means, having a control transistor connected between the negative side of said secondary battery connection means and the negative side of said connector, and a charge control portion for executing the ON/OFF control of said control transistor.

61. A power supply device comprising:

battery connection means for connecting a battery thereto;

an output terminal; and a DC-DC converter, said converter including:
 connection means for connecting a positive side of said battery connection means and a positive side of said output terminal,
 a control transistor connected between a negative side of said battery connection means and a negative side of said output terminal, and
 a control portion for executing control wherein the output voltage of said DC-DC converter is kept constant by executing ON/OFF control of said control transistor.

62. An electronic appliance including a power supply device, said power supply device comprising:

secondary battery connection means for connecting a secondary battery thereto;

an input terminal for connecting an external D.C. power supply;

an output terminal;

a first connection means for connecting a positive side of said input terminal and a positive side of said output terminal to a positive side of said secondary battery connection means;

a second connection means for connecting a negative side of said input terminal and a negative side of said output terminal;

a third connection means connected between a negative side of said secondary battery connection means and the negative side of said input terminal, and being turned OFF when charging current is flowing through said secondary battery connection means; and a charge portion having means for controlling a voltage on the negative side of the secondary battery connection means, for directing a charging current through said secondary battery connection means by the external D.C. power supply.

63. An electronic appliance including a power supply device, said power supply device comprising:

secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of said secondary battery connection means and the negative side of said connector, and being turned OFF when charging current is flowing through said secondary battery connection means; and a charge portion having means for controlling a voltage on the negative side of the secondary battery connection means, for directing a charging current through said secondary battery connection means by the external D.C. power supply.

64. An electronic appliance including a power supply device, said power supply device comprising:

secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of the secondary battery connection means and the negative side of said connector, and being turned OFF when a charging current flows through said secondary battery connection means;

a switching diode connected in the same polarity as said secondary battery connection means between the negative side of said secondary battery connection means and the negative side of said connector; and a charge portion having a DC-AC conversion portion, a transformer and an AC-DC conversion portion, and directing a charging current through said secondary battery connection means from said external D.C. power supply.

65. An electronic appliance including a power supply device, said power supply device comprising:

secondary battery connection means for connecting a secondary battery thereto;

a connector for connecting an external D.C. power supply;

an output terminal;

a first connection means for connecting a positive side of said connector and a positive side of said output terminal to a positive side of said secondary battery connection means;

a second connection means for connecting a negative side of said connector and a negative side of said output terminal;

a third connection means connected between a negative side of the secondary battery connection means and the negative side of said connector, and being turned OFF when a charging current flows through said secondary battery connection means;

a switching diode connected in the same polarity as said secondary battery connection means between the negative side of said secondary battery connection means and the negative side of said connector; and a charge portion for directing a charging current to said secondary battery connection means, having a control transistor connected between the negative side of said secondary battery connection means and the negative side of said connector, and a charge control portion for executing the ON/OFF control of said control transistor.

* * * * *